A. PAPINI.
COUPLING FOR FAUCETS, SPIGOTS, OR THE LIKE WITH FLUID RECEIVERS, HOSE, OR OTHER CONDUCTORS OF FLUIDS.
APPLICATION FILED JUNE 14, 1919.
1,343,228.
Patented June 15, 1920.
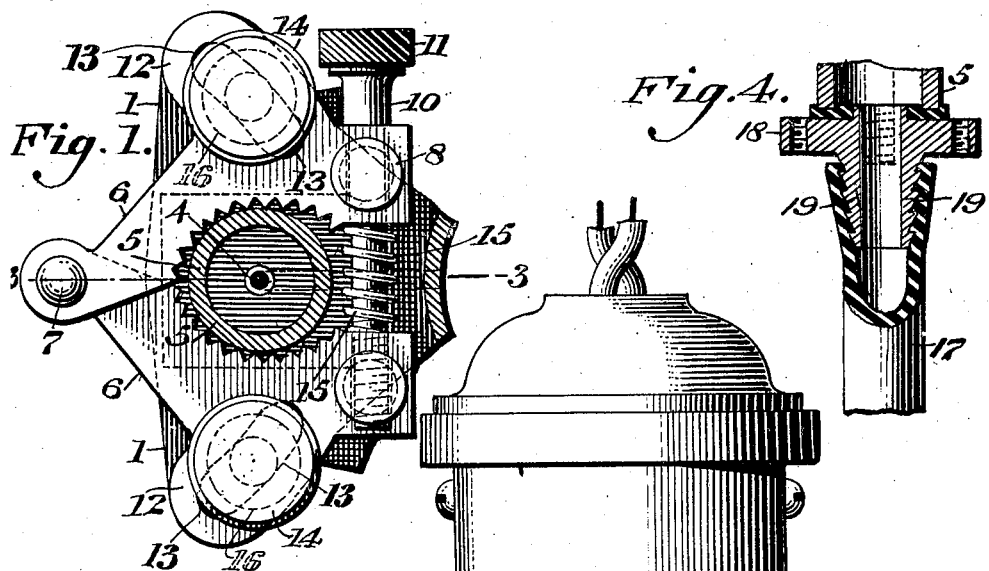
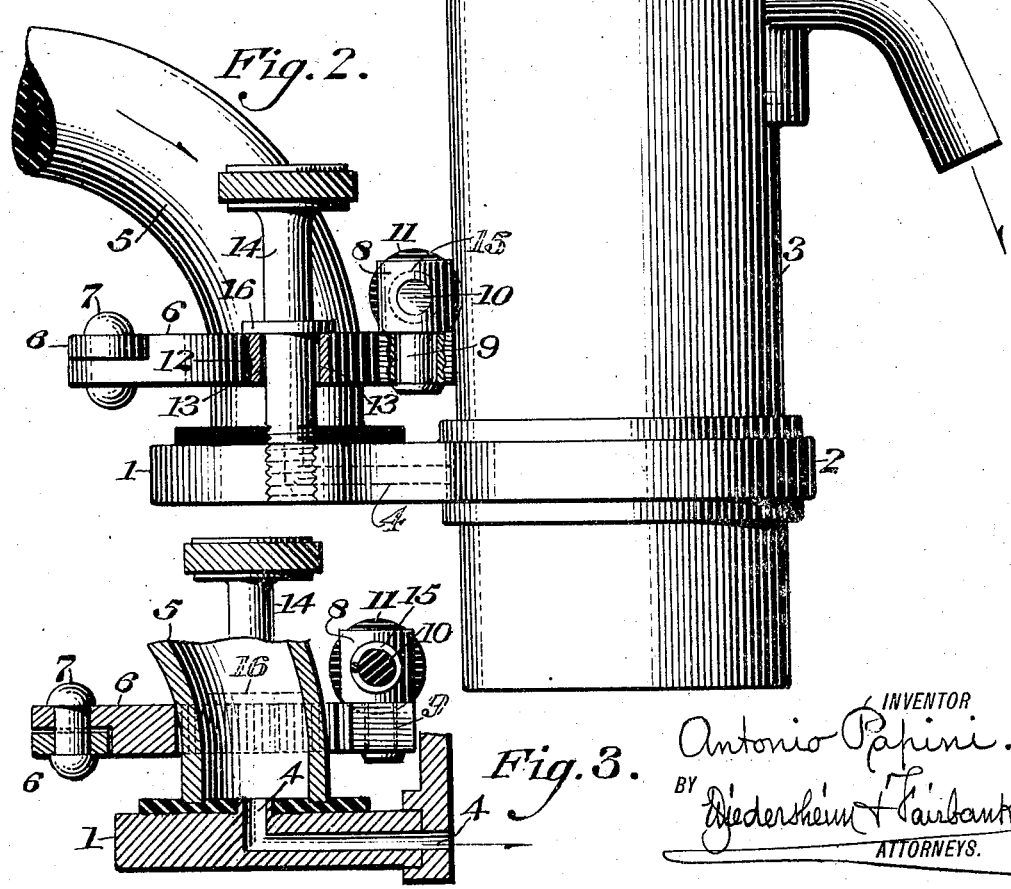
INVENTOR
Antonio Papini.
BY Diedersheim Fairbanks
ATTORNEYS.

UNITED STATES PATENT OFFICE.

ANTONIO PAPINI, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

COUPLING FOR FAUCETS, SPIGOTS, OR THE LIKE WITH FLUID-RECEIVERS, HOSE, OR OTHER CONDUCTORS OF FLUIDS.

1,343,228.   Specification of Letters Patent.   Patented June 15, 1920.

Application filed June 14, 1919. Serial No. 304,266.

*To all whom it may concern:*

Be it known that I, ANTONIO PAPINI, a subject of the King of Italy, having resided in the United States one year last past, and having declared my intentions of becoming a citizen thereof, residing in the city and county of Philadelphia, State of Pennsylvania, have invented a new and useful Coupling for Faucets, Spigots, or the like with Fluid-Receivers, Hose, or other Conductors of Fluids.

My invention consists of a novel coupling for a faucet, spigot, etc., with a fluid receiver or a hose, or other conductor for fluid from said faucet, spigot, etc.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a top or plan view of a coupling embodying my invention.

Fig. 2 represents a partial side elevation and partial vertical section thereof.

Fig. 3 represents a longitudinal vertical section on line 3—3 Fig. 1.

Fig. 4 represents a side elevation of a portion of a faucet, spigot, or the like, and a portion of a hose coupled thereto.

Similar numerals of reference indicate corresponding parts in the figures.

Referring to the drawings, 1 designates a plate or frame forming a ledge which is adapted to be attached by the band 2 to the casing 3 of a heater for water, or other fluid, or other fluid receiver.

In said plate is the angular passage 4 which is adapted to be placed in communication with the interior of said casing and with the spout 5 of a faucet, spigot, or the like, whereby the casing may be supplied with water to be heated, it being noticed that the ledge 1 is fitted to the mouth of the faucet 5, a suitable gasket or packing being interposed between said mouth and plate to form a water tight joint for the passage 3 for evident purposes.

6 designates a pair of jaws which are connected at one end by the pivot 7 whereby they may be opened and closed in lateral direction.

On the free ends of said jaws are the studs 8 whose depending shanks 9 are rotatably mounted in said free ends of the jaws, said studs having in their heads horizontally extending openings in which is received the adjacent portions of the transversely extending bolt 10, one end of which is screw-threaded for engagement with threads in the interior of the head of the respective stud 8 after the manner of a nut, the other end of said bolt having thereon an operating head 11, the adjacent portion of said bolt freely occupying the stud through which it passes, whereby by turning said bolt by its head 11 the jaws 6 may be opened and closed, it being noticed that the inner face of said jaws which are serrated are adapted to embrace the side of the faucet 5, and so take firm hold thereof.

On the sides of the jaws are the ears 12 in which are segmental slots 13 through which are passed the vertically extending bolts or screws 14 whose lower ends are screw threaded and adapted to enter screw threaded openings in the side portion of the plate 1 by which provision the jaws may be supported on the plate 1.

On the bolt 10 is the coil spring 15 which is interposed between the free ends of the jaws 6 and adapted to bear outwardly against the same, whereby when said bolt is properly rotated said spring is permitted to expand and thus serve to open the jaws.

The operation is as follows:—

The jaws 6 are fitted on the faucet and the bolt 10 is rotated to tighten the jaws on the faucet, and so take firm hold of the same and remain in position. The casing 3 has the ledge 1 adjusted to the mouth of the faucet as has been stated and the bolts 14 in the slots 13 are screwed into said ledge 1, thus connecting the jaws with the latter and assisting to retain them in their adjusted position on the faucet, while thus also firmly connecting the casing with the faucet and serving to support the former from the latter when so desired. The casing may now be supplied with fluid entering from the faucet.

When the bolts 14 are unscrewed from the plate 1, the latter and consequently the heater may be removed from the faucet, and when the bolt 10 is properly rotated, the jaws 6 are opened and so may be removed from the faucet.

In Fig. 4 I show the device as employed for coupling a hose or other conductor 17 of fluid with the faucet, spigot, etc. In this embodiment of my invention the flange 18 of the end plug 19 of the hose or conductor has therein threaded openings for the engagement of the ends of the bolts 14 therein, whereby said flange may be held with the gasket against the mouth of the nozzle of the faucet, etc., with a tight joint, while the hose, etc., remains firmly connected with the faucet, etc.

For the purpose of distinction, I denominate at this time the plate 1 and the flange 18 as abutments for the end of the nozzle of the faucet, etc., therewith.

Having thus described my invention what I claim as new and desire to secure by Letters Patent, is:—

1. In a coupling of the character stated, a fluid supply member, a fluid conductor, the latter having thereon an abutment which has therein a passage adapted to form a communication between said fluid supply member and said fluid conductor, jaws adapted to be clamped to the outlet portion of said member, means for closing said jaws, resilient means to open the jaws, and means adapting said abutment to be connected with said jaws.

2. In a coupling for a faucet, spigot, or other fluid supply member, jaws attachable to said member, means for closing said jaws and resilient means for opening the same, and an abutment on a conductor for said fluid from said member, and means on said jaws and abutment for connecting the latter with the former.

3. In a coupling of the character stated, a fluid supply member, a device on a fluid conductor, the same being adapted to abut the outlet portion of said member, jaws adapted to clamp said outlet portion for closing and resilient means for opening said jaws, and means on the latter adapted to be connected with said abutment device.

4. In a coupling of the character stated, a fluid supply member, a device on a fluid conductor, the same being adapted to abut the outlet of said member, jaws adapted to clamp said outlet portion of said member, studs mounted on said jaws, a bolt on said studs adapted to close said jaws, a resilient member on said bolt adapted to open said jaws, and bolt-like means adapted to pass through said jaws and engage said abutment.

5. In a coupling of the character stated, a fluid supply member, a device on a fluid conductor, the same being adapted to abut the outlet of said member, jaws adapted to clamp said outlet portion of said member, studs mounted on said jaws, a bolt on said studs adapted to close said jaws, a resilient member on said bolt adapted to open said jaws, and bolt-like means adapted to pass through said jaws and engage said abutment, said jaws having thereon segmental slots adapted to receive said bolts.

6. In a coupling of the character stated, a fluid supply member, a device on a fluid conductor adapted to abut the outlet of said member, jaws adapted to clamp said outlet portion, means mounted on the jaws to close the latter, means carried by a member of the closing means to open the jaws, and means adapted to pass through said jaws and engage said abutment.

ANTONIO PAPINI.

Witnesses:
JOHN A. WIEDERSHEIM,
N. BUSSINGER.